(12) United States Patent
Diez

(10) Patent No.: US 9,760,345 B2
(45) Date of Patent: Sep. 12, 2017

(54) RECURSIVE ONTOLOGY-BASED SYSTEMS ENGINEERING

(71) Applicant: Alfonso Diez, Madrid (ES)

(72) Inventor: Alfonso Diez, Madrid (ES)

( * ) Notice: Subject to any disclaimer, the term of this patent is extended or adjusted under 35 U.S.C. 154(b) by 37 days.

(21) Appl. No.: 14/809,053

(22) Filed: Jul. 24, 2015

(65) Prior Publication Data

US 2016/0026441 A1 Jan. 28, 2016

Related U.S. Application Data

(60) Provisional application No. 62/029,441, filed on Jul. 26, 2014.

(51) Int. Cl.
| | | |
|---|---|---|
| *G06F 9/44* | (2006.01) | |
| *G06F 9/45* | (2006.01) | |
| *G06F 17/30* | (2006.01) | |
| *G06F 17/27* | (2006.01) | |

(52) U.S. Cl.
CPC .......... *G06F 8/35* (2013.01); *G06F 17/30734* (2013.01); *G06F 8/36* (2013.01); *G06F 17/2785* (2013.01)

(58) Field of Classification Search
CPC .. G06F 8/35; G06F 17/30734; G06F 17/2785; G06F 8/36
See application file for complete search history.

(56) References Cited

U.S. PATENT DOCUMENTS

| | | | |
|---|---|---|---|
| 8,209,660 B2 | 6/2012 | Sundararajan et al. | |
| 8,407,593 B2 | 3/2013 | Korpipaa et al. | |
| 8,732,655 B2* | 5/2014 | Pfeifer | G06F 8/10 707/797 |
| 2008/0082959 A1* | 4/2008 | Fowler | G06F 8/24 717/104 |
| 2009/0007084 A1* | 1/2009 | Conallen | G06F 8/35 717/146 |
| 2009/0150854 A1* | 6/2009 | Elaasar | G06F 8/35 717/104 |

(Continued)

OTHER PUBLICATIONS

Cuong V. Nguyen, Towards automated model driven development with model transformation and domain specific languages, International Journal of Computer Science and Electronics Engineering (IJCSEE) vol. 1, Issue 1 (2013) ISSN 2320-4028 (Online), pp. 85-89.*

(Continued)

*Primary Examiner* — Thuy Dao
*Assistant Examiner* — Mongbao Nguyen
(74) *Attorney, Agent, or Firm* — Ferraiuoli LLC; Eugenio J. Torres-Oyola; Victor Rodriguez-Reyes

(57) ABSTRACT

The present disclosure proposes a new model engineering method and system that permits the creation of application systems without the need of program development. The system allows organizations to search for high performance development teams and methods, and develop high quality solutions. The present disclosure covers the three central areas of systems engineering: (1) a method for creating models which represent reality in a standardized way; (2) a procedure for transforming models into computable artifacts, that is, computer systems that behave as specified in the model; and (3) a collaborative method based in knowledge representations.

7 Claims, 9 Drawing Sheets

(56) References Cited

U.S. PATENT DOCUMENTS

| | | | |
|---|---|---|---|
| 2010/0175054 A1* | 7/2010 | Matusikova | G06F 17/227 717/136 |
| 2010/0199257 A1* | 8/2010 | Biggerstaff | G06F 8/76 717/104 |
| 2010/0269094 A1* | 10/2010 | Levenshteyn | G06F 8/20 717/109 |
| 2010/0325606 A1 | 12/2010 | Sundararajan et al. | |
| 2011/0197197 A1* | 8/2011 | Ni | G06F 9/547 718/104 |
| 2011/0219044 A1* | 9/2011 | Peukert | G06F 17/30734 707/805 |
| 2012/0102451 A1 | 4/2012 | Kulkarni et al. | |
| 2013/0047155 A1* | 2/2013 | Caspole | G06F 9/445 718/1 |
| 2013/0061204 A1* | 3/2013 | Makey | G06F 11/3684 717/104 |
| 2013/0080993 A1* | 3/2013 | Stravers | G06F 8/35 717/104 |
| 2013/0232464 A1 | 9/2013 | Jacquin et al. | |
| 2013/0239089 A1* | 9/2013 | Eksten | G06F 8/70 717/120 |
| 2013/0290926 A1 | 10/2013 | Tavarez | |
| 2014/0040312 A1* | 2/2014 | Gorman | G06F 17/2785 707/771 |
| 2014/0214399 A1* | 7/2014 | Gulwani | G06F 17/246 704/8 |
| 2014/0280370 A1* | 9/2014 | Oberle | G06F 8/51 707/803 |
| 2014/0282409 A1* | 9/2014 | Nassar | G06F 11/362 717/124 |
| 2014/0297676 A1* | 10/2014 | Bhatia | G06F 17/3043 707/760 |

OTHER PUBLICATIONS

T. Reiter, A Generation Framework for Domain-Specific model transformation languages, 2006, pp. 1-9.*

Viet-Cuong Nguyen, Domain Specific Language Approach on Model-driven Development of Web Services, 2014, pp. 1-18.*

Javier Luis Canovas lzquierdo, A domain specific language for extracting models in software modernization, 2009, pp. 1-15.*

* cited by examiner

RECURSIVE ONTOLOGY-BASED SYSTEMS ENGINEERING

RELATED APPLICATIONS

This application claims the benefit of U.S. Provisional Application No. 62/029,441 filed on Jul. 26, 2014, which is hereby incorporated-by-reference in its entirety.

FIELD OF THE INVENTION

The present disclosure relates generally to the field of computer-aided software engineering.

BACKGROUND

Computer-aided Software Engineering tools originated in 1982. This family of techniques has had little evolution outside the mainframe industry. The term CASE systems was very promising on the origins, but at the end it produced little results. During the 90's and early years of XXI century new concepts took traction: Business Process Management (BPM) tools, and Model Driven Architecture (MDA). BPM remains as a good mechanism to support certain business needs, while MDA disappeared with no practical results. At around the year 2000, the new term Model Driven Engineering (MDE) was coined.

The foundational work has evolved mostly in the Academia, with few commercial solutions. The quest of MDE is the development of information systems (we will refer to them as business solutions from now on) in an automated way, using the description of the intended product as the only source of work for its automated generation. The theoretical work produced in relation to MDE is grounded in the canonical definition of the modeling spaces (Atkinson and Khüne, *Model-Driven Development: A Metamodeling Foundation*, (2003) IEEE SOFTWARE; Stahl, T., & Lter, M. (2006). *Model-driven software development: Technology, engineering, management*. Chichester, England: John Wiley). Very succinctly, they propose four spaces: objects, models, meta-models (such as UML), and meta-meta-models (such as MOF), related hierarchically with an instantiation operation, plus two additional transformations, one between spaces (Model to Model or M2M) and one to text (Model to Text or M2T). M2T transformations produce the final software product that is defined by the models. There have been two schools of thinking in relation with the idea of generation of business solutions. The most important one (referred to as Indirect Modeling) attempts to 'automate programmers', while the other (referred to as Direct Modeling) attempts to 'execute the models'. Indirect Modeling attempts to generate source code in General Purpose Languages (GPL) such as JAVA and .NET, as if a programmer had developed the code. In summary, they attempt to create technologies that are able to read UML-like specifications and behave like programmers. Direct Modeling attempts to make the model an executable artifact by itself, as-is, without production of code nor intermediate transformations. Direct Modeling has large problems in terms of scalability of solution and its application to general problems.

The critical limitations of the current MDE standard model are: (1) the standard model does not provide a prescription or a technique for the transformation of models into executable business solutions; and (2) models do not support multilevel meta-modeling in a natural way, which is a standard feature of all large models and an imperative requirement for model reusability. When humans look at a complex reality, they tend to apply processes of abstraction at many levels, which creates mappings between the reality, our language and our mental patterns. Without this abstraction capability we are unable to lead with complex realities as we do. For this reason, the second limitation is of great importance.

These two theoretical limitations greatly restrict the development of large model-based infrastructures. The current state-of-the-art makes the erroneous assumption that every model can be transformed in a computable system, by unknown means, and that multilevel meta-models are not a critical feature in every large-scale deployment. The characteristics that should be required for a large implementation of a successful modeling tool are the following:

(1) Scalability: Target realities can be very large, so models have to support very large problems. For instance, in the domain of Enterprise Systems, models can be of the size of large organizations such as banks, insurance companies, manufacturing industries, and others. Thus, the models must be able to emulate every process and aspect of those companies.

(2) Persistence: Each model has to contain all the complexity of the target system in such a way that the evolution of the system is done through modifications in the model and transformations, and there is no relevant information outside of the model. This is equivalent as saying that the model persists through time.

(3) Composition: To make scalable and persistent properties manageable, the capability of decomposing large problems into small manageable ones is imperative. Later, these decomposed models are enacted as an executable solution that solves the problem as a whole.

(4) Automated deployment: If the model is persistent, the translation of the model to an executable form has to be automatic, in negligible time, without the need of any ad-hoc development, manual adjustments, and technical testing. Only functional testing related with the completeness and correctness of the model, including performance testing, should be required.

SUMMARY OF THE DISCLOSURE

The present disclosure proposes a new model engineering method and system that permits the creation of application systems without the need of program development. The system allows organizations to search for high performance development teams and methods, and develop high quality solutions. The present disclosure covers the three central areas of systems engineering: (1) a method for creating models which represent reality in a standardized way; (2) a procedure for transforming models into computable artifacts, that is, computer systems that behave as specified in the model; and (3) a collaborative method based in knowledge representations.

The disclosed system has been applied initially to enterprise business solutions, that is, computer systems used to manage every aspect of business processes such as customer relationships, operations management, logistics, inventory control, manufacturing processes, clinical processes, accounting and billing and many others. However, the methods described here can be used in other contexts. The only requisite for using the disclosed system is the existence of a semantic representation of Reality.

DETAILED DESCRIPTION

The present disclosure proposes a new model engineering method and system that permits the creation of application systems without the need of program development. The system allows organizations to search for high performance development teams and methods, and develop high quality solutions. The present disclosure covers the three central areas of systems engineering: (1) a method for creating models which represent reality in a standardized way; (2) a procedure for transforming models into computable artifacts, that is, computer systems that behave as specified in the model; and (3) a collaborative method based in knowledge representations.

Figure 1:
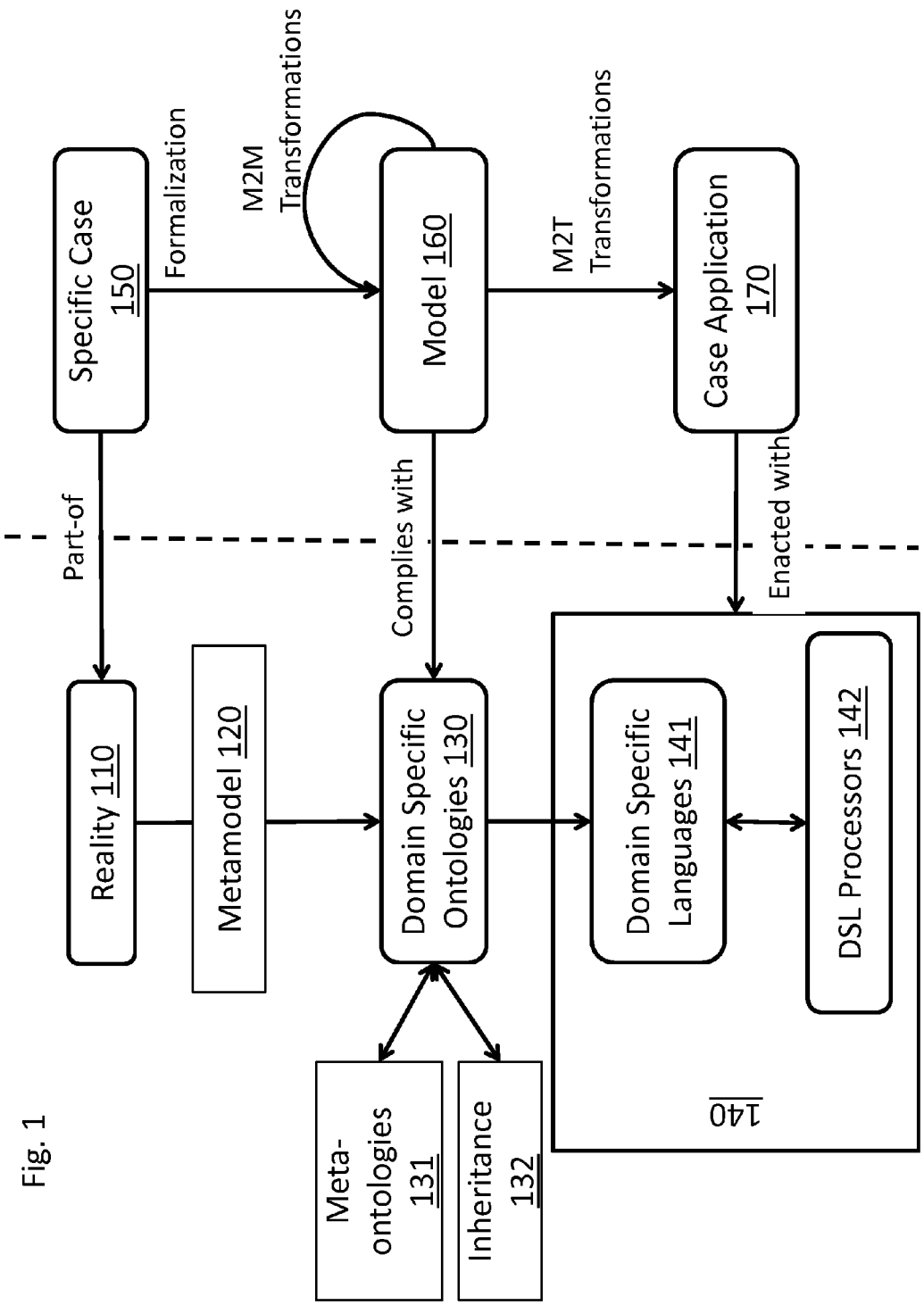
FIG. 1 shows a general overview of the Model Representation Method.

FIG. 1 shows a general overview of the Model Representation Method. This method creates a standardized way to generate models about Reality with the following properties: (1) it is able to create representations of any type of reality, provided it can be enclosed in a semantic field; (2) supports unlimited abstraction levels and abstraction hierarchies; (3) makes decomposable models in parts that can be arranged or composed in different ways; (4) induces a method for creating multilevel abstract representations of the reality in a canonic way; (5) provides the technical editors and repositories for that models conforming the ontologies; and (6) transforms models into executable information systems in an automated way and without the need of programming.

As shown in FIG. 1, the Model Representation is divided into two parts, divided by the dotted arrow. The left side permits the creation of standard technical solutions for ontologies, while the right side shows how these standard solutions can be used to solve specific problems. The Model Representation comprises:

Realities 110

A Reality 110 can be any part of the Human Experience. The preferred embodiment here refers to the business domain, but any other domain can be considered. Realities are described using specialized languages called metamodels 120. The same Reality can be understood using different metamodels, which produce different comprehensions and propositions about Reality. For instance, a wire can be described in terms of its mechanical properties or in terms of its electrical properties, or a computer system can be described in terms of technical features (user interfaces, data bases) or in terms of the business processes supported by it. In other words, the specialized language used to describe ontologies comprises a description of terms selected from a group comprising physical properties (corresponding to physical descriptions of the reality, e.g. mechanical or electrical properties) and non-physical properties (corresponding to logical models or semantic data properties).

Ontologies 130

An Ontology is a normalization of a conceptualization, that is, a formal representation of the understanding of the Reality 110 using specific metamodels 120. Thus, following the previous examples, we will have domain ontologies for electrical and mechanical characteristics, or for information system components and for business process mapping. Ontologies have two different relations between them: meta-ontologies 131 and inheritance 132. The inheritance relationship between classes in the same or different ontologies is the same that the inheritance used in Object Oriented Programming. A metaontology is an ontology that is an abstraction of another ontology. For instance, given a traditional class-oriented ontology to describe classes in business applications, one could create a more abstract ontology that classifies classes in term of their 'Purpose' in the business. Such an ontology would be an abstraction of the first one. Meta-ontologies 131 are able to produce statements about the underlying ontology 130, therefore they are very powerful for creation of M2M transformations.

Figure 2:
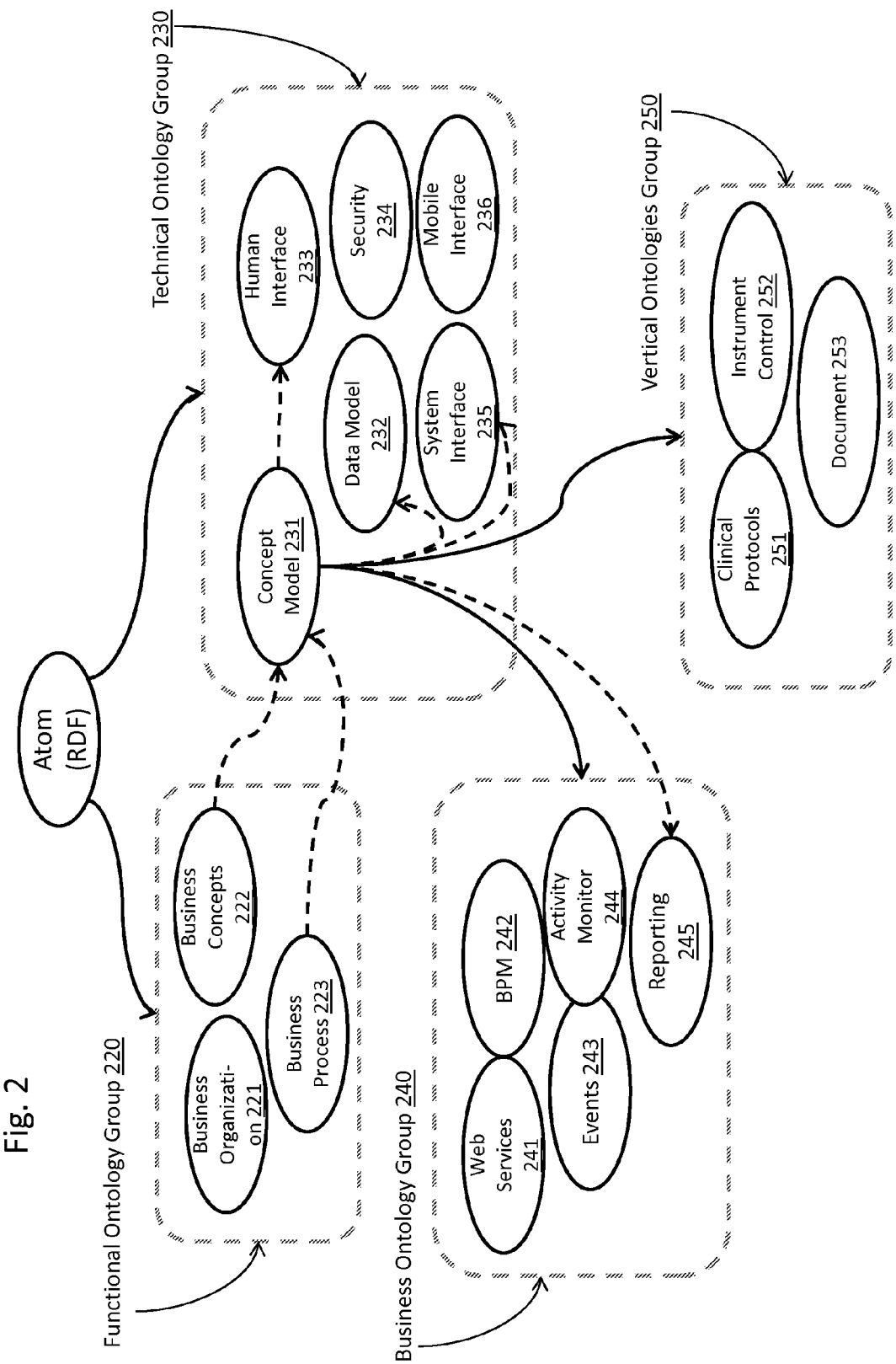
FIG. 2 shows an exemplary Lattice of Ontologies.

FIG. 2 shows an example of a lattice of ontologies in different domains and the relations between ontologies. Most of the relations between ontologies are hidden and only some ontological groups are represented. Solid arrows represent inheritance and dotted arrows represent M2M transformations. The figure shows four ontology groups: the functional ontology group 220, the technical ontology group 230, the business ontology group 240, and the vertical ontologies group 250. Each ontology grouop is composed of different ontologies. For example, the functional ontology group 220 may contain ontologies for Business Organization 221, Business Concepts 222, and Business Processes 223; the technical ontology group 230 may contain ontologies for Concept Model 231, Data Model 232, Human Interface 233, System Interface 235, Security 234, and Mobile Interface 236; the business ontology group 240 may contain ontologies for Web Services 241, Business Process Management (BMP) 242, Events 243, Activity monitor 244, and Reporting 245; and the vertical ontologies group 250 may contain very different ontologies such as Clinical Protocols 251, Instrument Control 252, or Documents 253.

In an embodiment, ontologies only contain class definitions (classes, relations, attributes, axioms, etc) but do not contain instances, except when they are a fixed enumeration of the class (for instance, gender options).

Technical Solutions 140

A Technical Solution is an artifact that is able to implement models and execute them. In the preferred embodiment, Technical Solutions 140 are composed of two parts: Domain Specific Languages 141 and Language Processors 142.

1. Domain Specific Languages (DSLs): It is known that any ontology can be represented in a Domain Specific Language. These languages can be ontology-oriented such as OWL, market standards such as SQL, or ad-hoc languages, often with XML o JSON structures. When an Ontology is defined, one or more DSLs are specified, along with the transformations M2T that map the Ontology characteristics into textual files with the DSLs formats.

2. Language Processors (LPs): A Language Processor is a computer program, or a part of it, that process DSLs and data to produce some result. For instance, a RDBMS engine takes SQL and data files to generate datasets; an Internet Browser takes HTML, CSS and JS to produce pages. LPs are created to process DSLs, and can generate output data or other DSLs.

When we develop a family of ontologies, we create a number of DSLs and LPs for them. For instance, if we create an ontology to describe computer screens (pages, controls, etc.) we will produce a transformation of the description of a computer screen in some DSL (could be XForms, Polymer, html, ad-hoc, etc.), along with the system to process the DSL (an internet browser, an ad-hoc client system, etc)

Specific Cases 150

Specific Cases 150 are examples of a Reality 110 that we want to analyze. For instance, within the domain of Business Applications a Procurement System for ABC Company will be a Specific Case. When we take the Specific Case and analyze it using the metamodel(s) 120 that we used for the embedding Reality 110, we can map the characteristics of the Specific Case 150 in terms of the Domain Specific Ontologies 130. For instance, we will describe business concepts (classes), user actions (human interfaces), etc. This description is a Model 160.

Models 160

Figure 3:
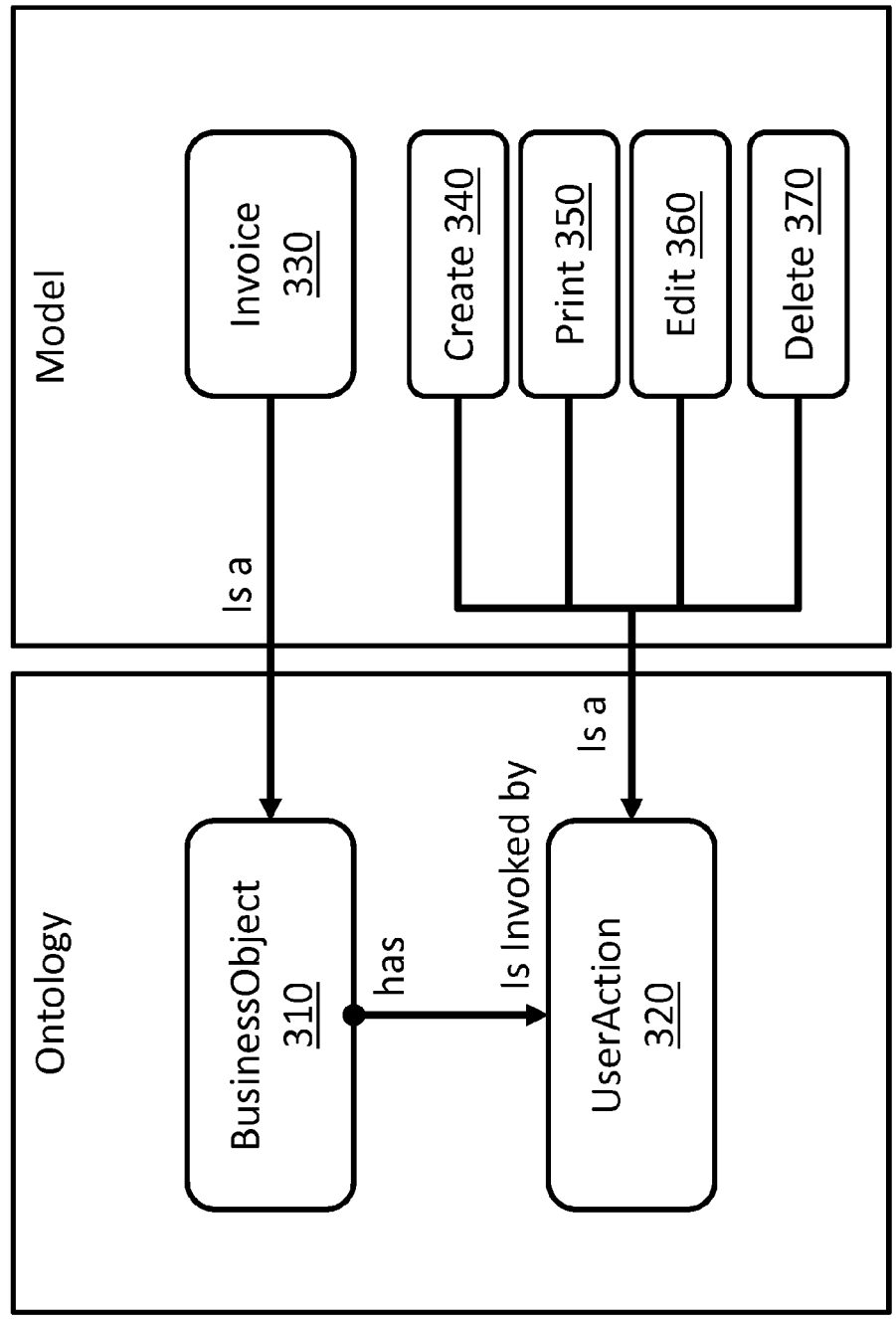
FIG. 3 shows an exemplary Ontology Classes and Model Instances.

A Model 160 is the description of a Specific Case 150 in conformance with a number of Domain Specific Ontologies 130, which are relevant for that Specific Case 150. Thus, Models 160 are sets of formal definitions about Reality 110 that are done following the formalisms defined by the Domain Specific Ontologies 130. The same reality can be described using different ontological layers (inheritance 132) or resources (meta-ontologies 131). For instance, using a previous example, we can describe a Business Application directly, or we can use the 'Purpose' ontology and then generate the application template using an M2M transformation. An embodiment of the relation between models and ontologies is shown in FIG. 3. Ontology classes are abstract descriptions as BusinessObject 310 or UserAction 320, that are referred by model instantiations, such as the BusinessObjetct Invoce 330, with the UserActions Create 340, Print 350, Edit 360, and Delete 370.

Case Applications 170

Once we have developed a Model 160 (totally or partially), it is transformed in order to enact it as an Case Application 170 that satisfies all the requirements that have been added in the Model 160. The enactment of a model is done in two steps:

1. Transformation of the Model into a set of DSLs. This can be done in a general way because we have created previously M2T transformations between ontologies and DSLs. Given that Models are conformant with ontologies, every model can be transformed into DSLs following the same transformations.
2. Enactment of the DSLs using their corresponding Language Processors. This is done in a general way, because LPs have been designed precisely for that. The primary use of DSLs is to support the rules for ad-hoc Language Processors (LP) that will perform the functions that the final information system is expected to do. For instance, in the ontology of Information Systems, a JSON-based language may describe the composition of a user interface, or an XML-based language may describe a business process model (BPM) diagram. Frequently, a mixture of standard and ad-hoc languages will be used.

Figure 4:
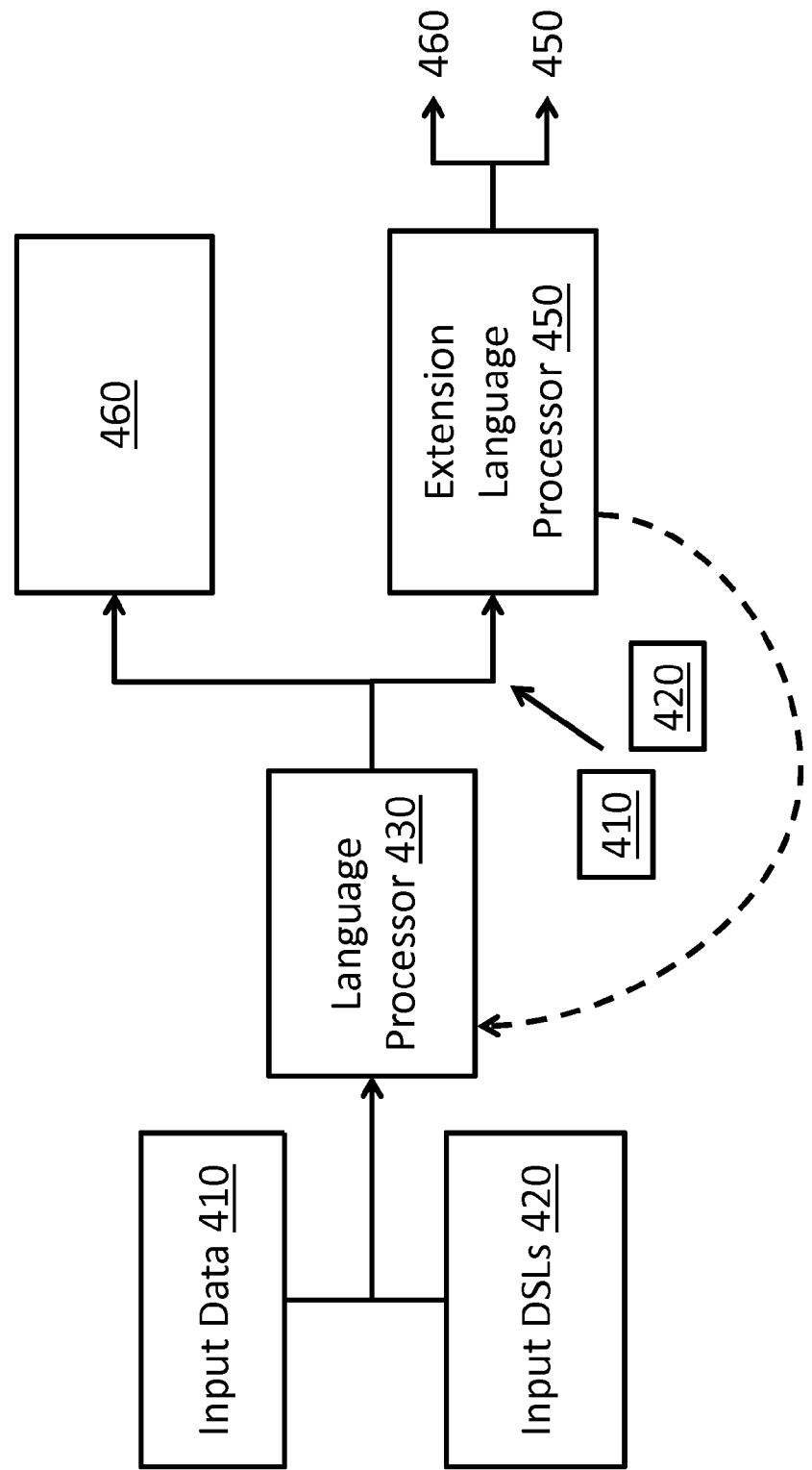
FIG. 4 shows an embodiment of the Language Processor (LP).

The present disclosure is directed to a recursive ontology-based model engineering method and system useful for providing architecture-agnostic systems engineering. In an embodiment, shown in FIG. 4, this model-based architecture is comprised of:

(1) An orchestrator LP 430 (main LP), that receives the complete structure of the model to be executed. The LP 430 receives input data 410 and input DSLs 420 with the rules that it has to follow. The LP 430 processes the data using the input DSLs 420 and produce two kind of outputs: traditional outputs 460 readable by humans, machines or programs, or enactments of Extension LPs 450.

(2) A number of extension LPs 430 that will perform specific functions. The LP 430 will pass input data 410 and DSLs 420 to the Extension LP 450. This process can iterate many times. Frequently the extension LPs will be commercial standard products, such as RDBMS, Internet browsers, operating systems programs or components, etc. Extension LPs 450 may also be ad-hoc systems performing specific tasks associated with an ontology. Examples of these ad-hoc LPs can be User Interface Manager, Event Management, BPM Engines, Report Generation, Web Service Publication, Document Management, and Organization Management.

Figure 5:
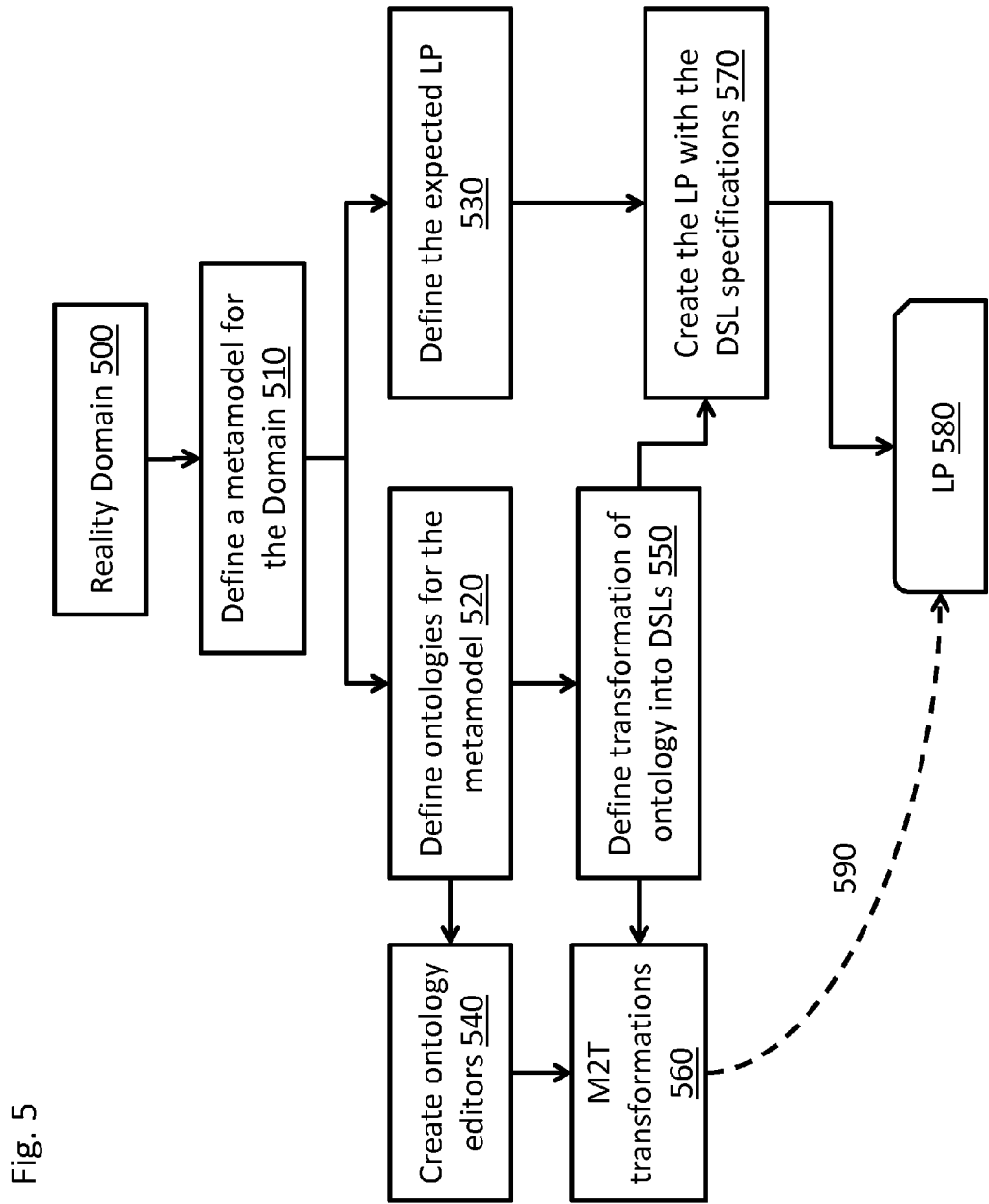
FIG. 5 shows an exemplary procedure to create a Language Processor.
Figure 6:
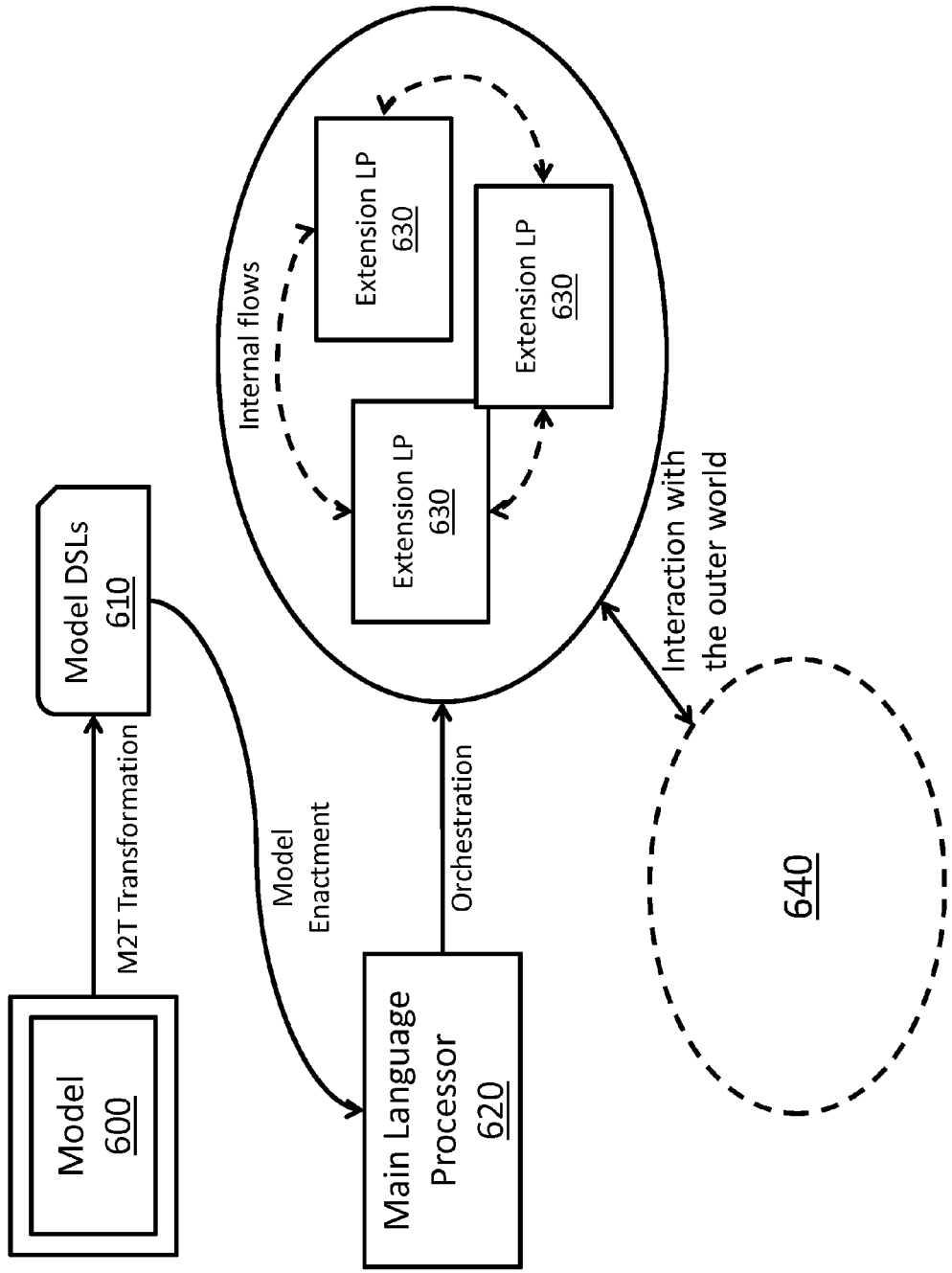
FIG. 6 shows an exemplary diagram of the enactment of a model using Language Processors.

An embodiment of a technique for the creation of an ad-hoc Language Processor is depicted in FIG. 5. Given a Reality Domain 500, a language about that domain is defined as a Metamodel 510. The metamodel is formalized as an ontology 520 and also the technical characteristics and functional behavior of the objective LP are specified 530. Now, using 520 we create the ontology editors 540, and the structure of the transformations that will serialize the ontology into DSLs 550. Using rules defined into DSLs 550, we create the M2T transformations 560 that will be used to transform models into DSLs. With the definition of DSLs 550, and the requirements defined in 530, the LP 580 is created. This is often done using traditional programming, but can be created using the same model-driven methods described in FIG. 8. The instantiation 590 of the LP 580 is done using the resulting transformation of 560. This instantiation is shown in FIG. 6, where a model 600 is transformed using M2T transformations into a number of DSLs 610. Since any ontology o can be transformed into a number of DSLs, every model 600 conforming o can be transformed into the same set of model DSLs 610. If a set of LPs is able to process that set of DSLs, that LP-set can process any model conforming o. In other words, we have solved the problem of model instantiation, without source-code production, at large scale.

The DSLs 610 are used by Main LP 620 to obtain the rules that has to follow. The Main LP 620 will orchestrate a number of Extension LPs 630, providing additional DSLs and or raw data. These Extension LPs 630 can also exchange information between them and with the outer world 640: other programs, machines, and human beings.

In one embodiment, the information flows between the Main LP 620 and Extencion LPs 630 can be structured in various layers to produce a web dialog based on a User Interface Ontology. First, the Main LP 620 receives the event for producing a web dialog, as specified in the Model 600. The Main LP 620 analyzes the definition of the web dialog, and decomposes its components: controls, lists, tabs, buttons, etc (being this terms part of the User Interface Ontology). Later, for each component in the model definitions, the Main LP 620 orchestrates the requests for retrieving data (i.e. preparation of SQL and SQL execution to a given RDBMS; requests from web services; reading data from flat files; instantiation of data from class definitions and so on).

Following the rules in the Model 600, the Main LP 620 dynamically prepares the raw data and the description language of the requested web dialog. Since the description language of the web dialog is defined in the User Interface Ontology, the data requests are passed to the User Interface LP (an extension LP 630) corresponding to the User Interface Ontology, which converts the received requests into other languages and data structures based on the underlying technologies (i.e. XML, XSL, CSS, HTML, SVG, JS, etc.). The User Interface LP then passes the data to the Web browser, which produces the final result for the user.

This embodiment shows how a simple event can trigger the composition of many actions using many LPs and languages, and that part of LPs can be intermediate layers to transform data and languages.

In another embodiment, a "User Interface" for a "mobile smartphone" may be described. The descriptive elements of the decomposition of the "User Interface" concept, both static and dynamic, are part of the ontology, and the translation of them into Reality (i.e. wireframe of the interface into real smartphones) is done by the metamodel. With this information, an LP is able to produce real user interfaces in real smartphones using the semantic decomposition of the ontology.

It is clear that a specific ontology can be transformed into more than one DSL, and also that LPs can process more than one DSL. For instance, the User Interface Ontology can be transformed into a language for screen formating, another for transition rules between screens, another for temporary storage of data, among others.

Dynamic Creation of Models

Another inventive aspect of the disclosure is dynamic creation of models. Dynamic creation of models can be achieved by creating recursive ontology-based LPs, where the output of a first LP is directed as the input of a second LP. A straightforward example for this is the real-time creation SQL or HTML sentences. In the traditional approach, the business logic is a fixed set of behaviors, which has to be designed and developed in advance. In this ontology-based approach, the business logic can be generated dynamically using information about the business problem, the user that is interacting with it, and the context in which this interaction occurs. The result can be as variable and complex as admitted by the embedded heuristics, the only limit is the semantic of the languages and the capacities given to the LPs.

Figure 7:
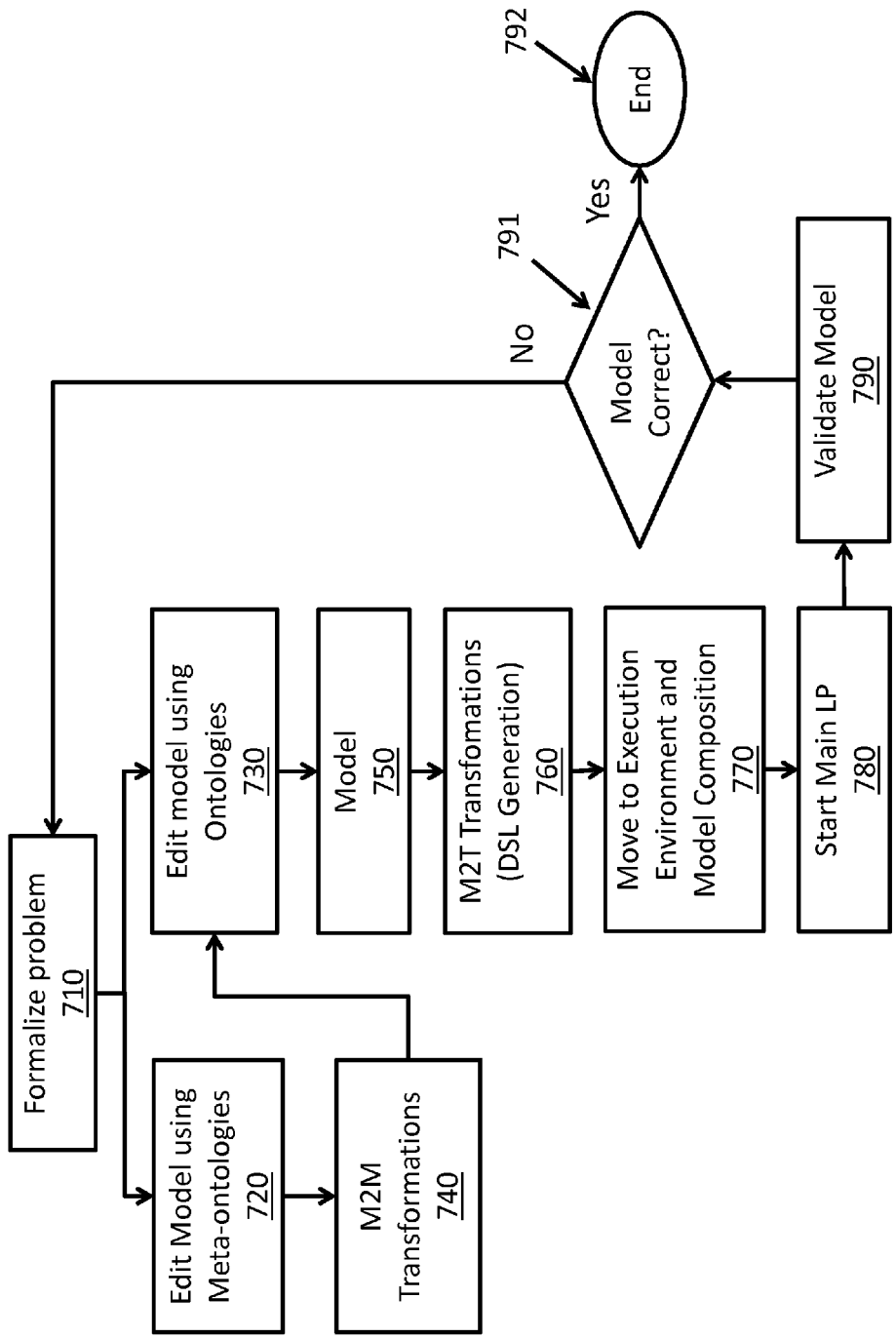
FIG. 7 shows an exemplary procedure to create a solution, under a set of ontologies.

The process for the creation of systems formalized as a set of ontologies, is different when a combination of ontologies, models and LPs is required. As shown in FIG. 7, this process can based on the following steps:

(1) Problem formalization 710. The problem that has to be solved is described formally using a model editor 720 and 730 that is compliant with the set of ontologies that are relevant for the problem and domain. For this work, two types of Domain Experts are need: one for the problem domain, and one for ontologies and models. For instance, if the problem is the procurement process in a manufacturing company, we need experts about manufacturing and procurement, and also experts about the involved ontologies. Knowledge about ontologies and models can be very specialized, as the number and complexity of ontologies increases.

(2) If meta-ontologies have been used in the modeling process, generation of models using M2M transformations 740 is performed.

(3) Once the Model 750 with a reasonable coverage of the problem has been described in the model repository, it is transformed, using M2T Transformations 760, into the languages associated with the ontologies used. These transformations are automated by the system and generate a number of computer files that contain the model specifications in the proper languages. This set of computer files will be called Executable Model.

(4) The Executable Model is transferred to the Execution Environment 770.

(5) The Main LP 780 is started, reads the Executable Model, and prepares to manage the events relevant for the problem. Once the events appear (a user login transaction, a message in a port, a time controlled event, etc.), the Main LP processes the actions and orchestrates the extension LPs.

(6) The system is then validated 790 by the domain experts, to check if the transformation of the problem description into a model, done by the model experts, satisfies their expectation in terms of functionality, quality, performance, user experience, etc.

Systems consistent with the present disclosure implement a number of techniques to improve development, reducing the time needed to produce solutions to a minimum. These techniques are the following:

In some embodiments, meta-ontologies are applied to many components of the system. Meta-ontologies allow the transformation of a small number of definitions into a large number of technical specifications in areas such as data models, user interfaces, systems integration, reporting and dashboards, etc. Meta-ontologies also allow design templates, simplifying the compliance with design standards and conventions. Importantly, meta-ontologies allow incorporation of expert domains in the modelling step.

In some embodiments, it is interesting to use functional ontologies to gather the functional information about the intended solution. These ontologies will help to collect all information about the domain, even if this information will not be transformed into DSLs. The use of such ontologies diminishes the comprehension and validation efforts, and simplifies the production of functional descriptions such as process descriptions, user manuals, etc. Importantly, high-level specifications may document the life cycle of the model, incorporating control features that frequently are essential for a comprehensive solution management.

In some embodiments, graphical language ontologies are provided to implement solutions using graphical representations. This improves user experience, simplifies the development of the models by domain experts and model experts, and facilitates faster validation of results. Specific ontologies and languages can be developed for this purpose, to be applied in model editors.

In some embodiments, tools for problem composition and decomposition are provided. Problems can be fragmented in two main characteristics: by functional grouping (for example, Finance, Procurement, HR, etc.) and problem abstraction (for instance, Customer Layer, Product Layer, etc.). Large problems are decomposed in small models that are managed by smaller teams. Each model has its own life cycle for development and evolution. Models can be totally independent of can have inheritance relationships that allow a model to use or modify classes defined by other models. Models are composed again in execution: the main LP engine will receive the union of the models as the model to execute.

In some embodiments, a model can be transformed into an ontology, as a way to reuse it in many solutions. The model and its behavior are transformed into a formal metamodel, ontology, DSLs and LPs.

One of the fundamental requirements of solutions development based on models is the capability to model realities of any type, size and complexity. The disclosed system is able to give support to this large-scale characteristic in the following way.

Figure 8:
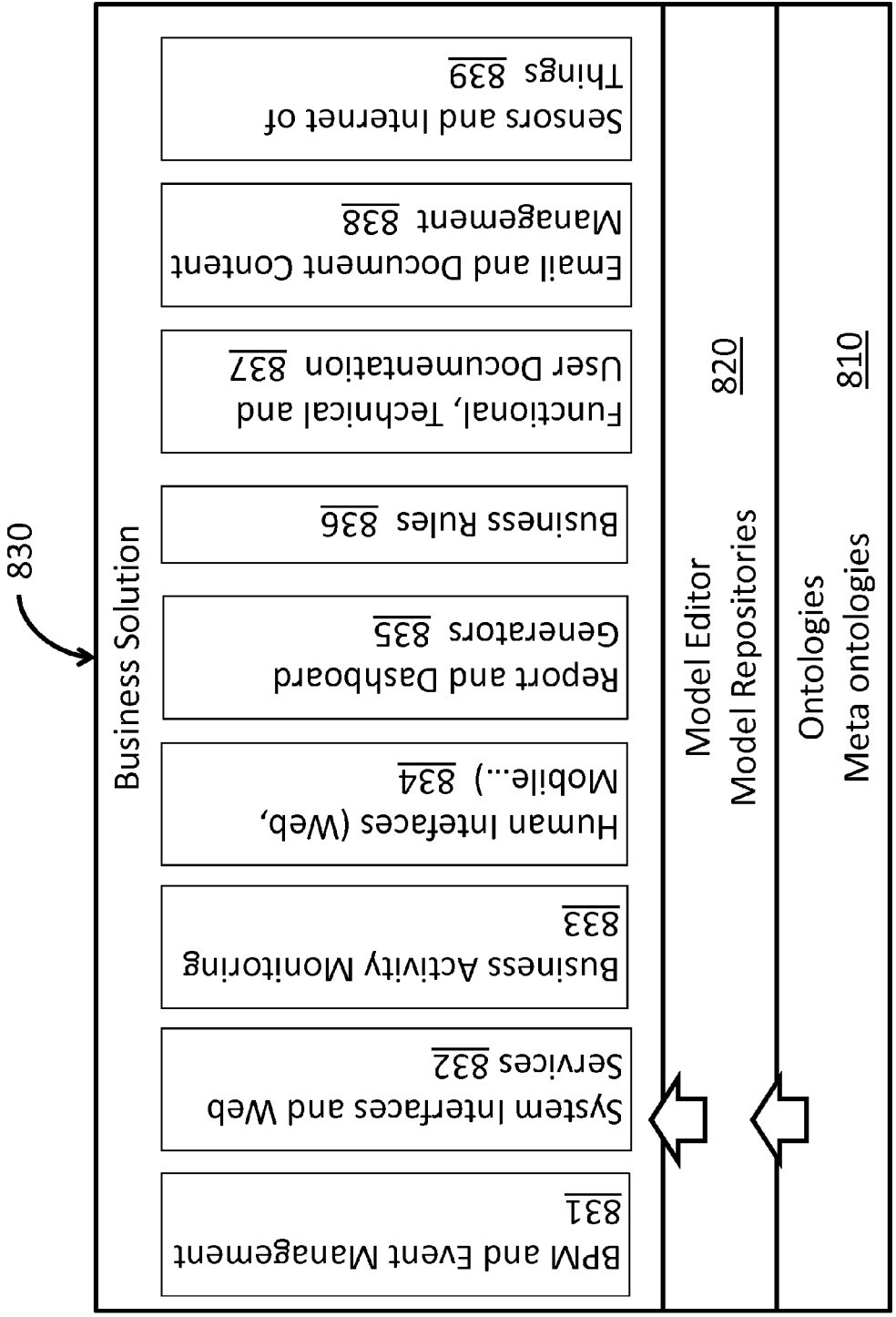
FIG. 8 shows a diagram of the Large Model Scope, Coherence and Completeness.

FIG. 8 shows how the use of models 820 based on ontologies 810 produce a comprehensive approach for any size of business solution 830, regardless of its functional complexity. The functional areas 830 shown in FIG. 8 are the most frequently found in business solutions (BMP and Event Management 831, System Interfaces and Web Services 832, Business Activity Monitoring 833, Human Interfaces 834, Report and Dashboard Generators 835, Business Rules 836, Functional Technical and User Documentation 837, Document Content Management 838, Sensors and Internet of Things 839), however the generality of the approach permits the adaptation of the diagram to any business requirement. It is important to note that the creation and evolution of solutions is always done from the more abstract layer 810 to the more concrete one 830. This is the characteristic of model persistence, which guarantees that a model is always applicable and evolves smoothly on time, depending only in the evolution of the business requirements and regardless of the evolution of the technology.

One of the main problems in systems development is that we have to apply different technologies for different regions of the problem domain. For instance, if a problem requires web transactional capabilities, analytic functions, mobility features, along with BPM, document management and systems automation, a traditional approach will eventually gather six or more systems all of them covering the different parts the problem, with different technical implementations, suppliers, evolution life cycles and obsolescence situations. Also, many integration schemas have to be created and maintained. The use of ontologies, and the orchestration of the models by the Main LP, eliminates all these problems. Coherent models are able to describe the business problem from a Business Process-Centric view, without taking into account the technical implementations. However, this does not mean that all technologies have to be reduced to model-based technologies. The implementation of an ontology by a Language Processor can encapsulate a given technology, making it part of a model description. WSLD or RESTful languages will usually support this interaction, although many other integration schemas can be used.

In addition to Model Persistence and Model Coherence, the characteristic of Completeness is also needed to be compliant with the Large-Scale requirement. A model is complete if all parts of the final solution can be described in some model, that is, that no fragments of ad-hoc code have to be written or maintained. For example, suppose a web model-based management system, which in a point of its life cycle requires off-line support using mobile devices such as smartphones. These mobile systems can be developed using traditional technologies, as ad-hoc programs, or can be built as mobile LPs, managed by models, extending the modeling capabilities to mobile devices. This second scenario is complete, while the first it is not. That is, a model is complete if all parts have supporting ontologies. If the model is complete, model capabilities can be optimized. For instance, we can create M2M transformations, transforming web models into mobile models with little cost.

Figure 9:
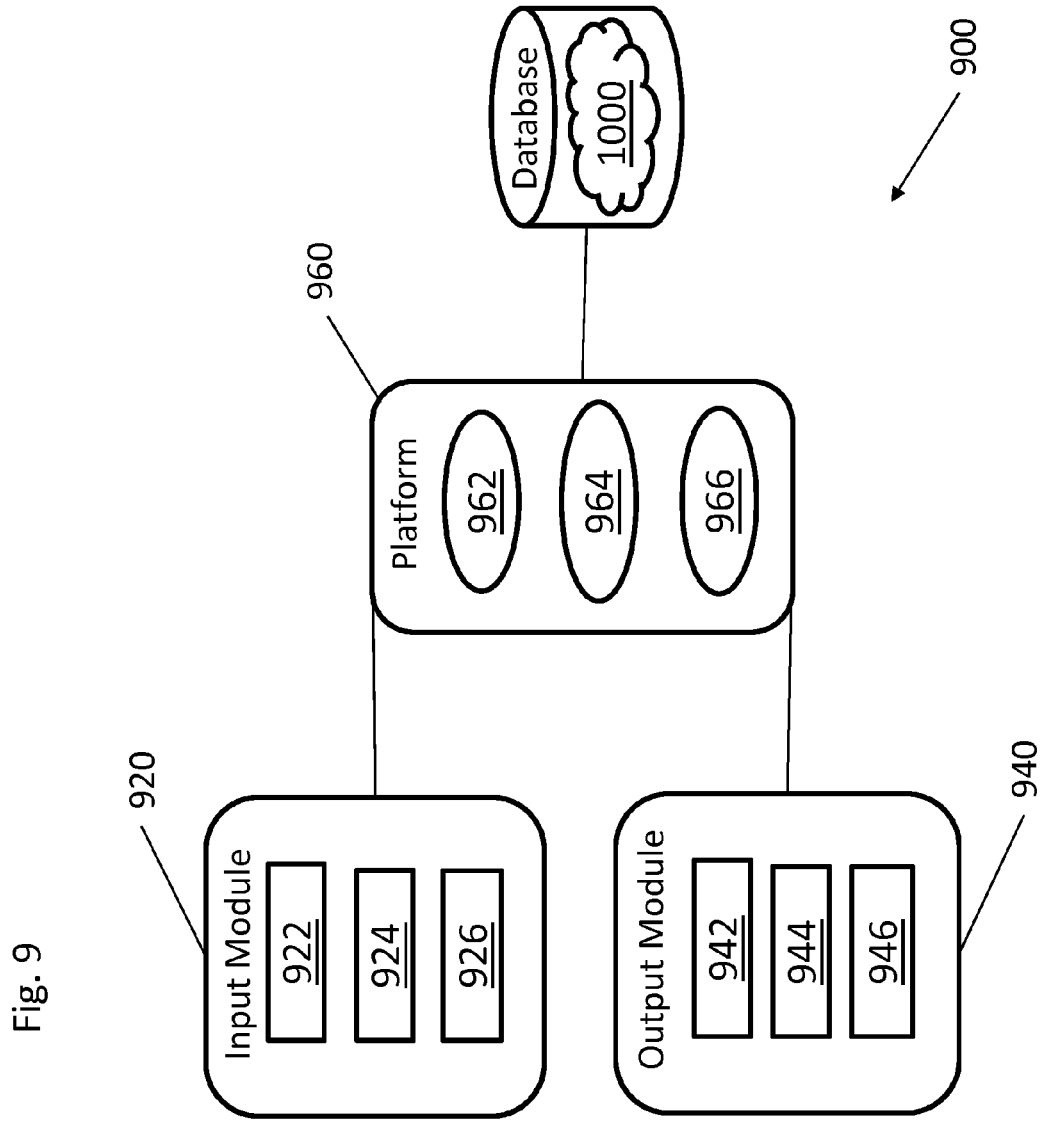
FIG. 9 shows a lock illustration of an exemplary disclosed system for recursive ontology-based system engineering in a platform-independent environment.

The embodiments of the present disclosure may be implemented, through the use of general-programming languages (such as C or C++). The program code can be disposed in any known computer-readable medium including semiconductor, magnetic disk, or optical disk (such as CD-ROM, DVD-ROM). For example, the model engineering tool 900 is disposed in a computer readable medium as a computing platform 960. In the embodiment of FIG. 9, the computing platform 960 may include a cloud computing provider, a standalone web-server, a personal computer (PC), a mainframe computer, or a laptop computer configured to perform various functions and operations. That is, computing platform 960 may include software functionality and hardware capabilities to implement the features of the present disclosure according to an embodiment of the disclosure. Computing platform 960 may be implemented, for example, by a general purpose apparatus selectively activated or configured by software stored in memory of the apparatus, or may be a specially constructed computing platform for carrying out the features and operations of the model engineering tool 900. It is contemplated, that the computing platform 960 may be accessible via a web browser without the need to download and install an application on every device in which the user desires to experience the model engineering tool features in the manner enabled by the present disclosure. That is, the model engineering tool features of the present disclosure reside in the cloud and thus are executable over a web browser or may reside locally, such as in a smart phone application downloaded from an application marketplace or preloaded by the smart phone's manufacturer. However, the model engineering tool may be accessible through a computing platform 960 having locally executed software to perform the model engineering tool features of the present disclosure.

In order to perform these tasks, computing platform 960 may also be implemented or provided with a wide variety of components or subsystems including, for example, one or more of the following: a processor 962, a co-processor 964, a register 966, and/or other data processing devices and subsystems. Computing platform 960 may also communicate or transfer model-related data as well as and feedback provided by the user or third parties via input module 920 and/or output module 940 through the use of wired connections, wireless connections or other means of communication, as depicted in FIG. 9.

In an exemplary embodiment, a firewall may prevent access to the computer platform 960 by unauthorized external entities. It is further contemplated that computing platform 960 may require user authentication, such as password verification, biometrics, pattern recognition, speech recognition or similar means, in order to prevent unauthorized users from gaining access to sensitive information, files, and recursive ontology-based engineering preferences associated with a particular individual.

It is further contemplated that communication between computing platform 960 and input and output modules 920, 940 can be achieved through the use of a network architecture (not shown). In such an embodiment, the network architecture may include, alone or in any suitable combination, a telephone-based network (such as a PBX or POTS), a local area network (LAN), a wide area network (WAN), a VPN, a dedicated intranet, and/or the Internet. Further, the network architecture may include any suitable combination of wired and/or wireless components and systems necessary in order to carry out the present disclosure. By using dedicated communication links or a shared network architecture, computing platform 960 may be located in the same location or at a location geographically remote from input and/or output modules 920, 940.

Input module 920 may include a wide variety of devices to receive and/or provide the data as input to computing platform 960. As illustrated in FIG. 9, input module 920 may include an input device 922, a storage device 924, and/or a network interface 926. Input device 922 may include a keyboard, mouse, touch screen, stylus, touchpad, disk drive, video camera, magnetic card reader, or any other suitable input device for communicating data to computing platform 960.

Memory 1000 may be implemented with various forms of memory or storage devices, such as read-only memory (ROM) devices and random access memory (RAM) devices. Storage device 924 may include a memory tape, disk drive, a flash memory card, an SD card or a microSD card for reading and providing data (including video files) as input to computing platform 960. Network interface 926 may receive data over a network (such as a LAN, a WAN, a mobile network, such as EDVO, 3G, 4G, GSM, an intranet or the Internet) and provide the same data as input to computing platform 960. For example, network interface 926 may be selectively connected or connectable to a public or private database for purposes of receiving information about one or more users, user files, video clips and other related data from computing platform 960.

Output module 940 may include a display 942, a printer device 944, and/or a network interface 946 for receiving the information provided as output from computing platform 960. As indicated above, the output module 940 from computing platform 960 may include a display showing model engineering tools in the manner described herein. The output from computing platform 960 may be displayed or viewed through display 942 (such as a CRT, LCD, CSTN, TFT, TFD, OLED, capacitive, resistive, AMOLED, super AMOLED, haptic/tactile, Gorilla glass or Retina type) and printer device 944. Network interface 946 may also facilitate the communication of the output from computing platform 960 over a network (such as a LAN, a WAN, a mobile network, such as BDYO, 3G, 4G, GSM, an intranet or the Internet) to remote locations for debugging, reviewing or providing backup.

What is claimed:

1. A model engineering non-transitory computer-readable medium comprising:
    at least a first description of reality, said first description of reality comprising at least a first ontology, said first ontology comprising a specialized language, said specialized language comprising a selected description of a selected term, wherein said selected description is selected from a group comprising physical properties and non-physical properties;
    at least a first model based on said first ontology, wherein the first model is transformed via a model-to-text transformation into at least a first domain specific language, wherein said first domain specific language comprises a textual representation of said first ontology; and
    at least a main language processor, wherein said main language processor receives said first domain specific language and enacts said first domain specific language as an executable solution, wherein said main language processor further enacts at least one extension language processor;
    further comprising a second ontology and a second model based on said second ontology, wherein the second model is further transformed via a model-to-text transformation into a second domain specific language, wherein said second domain specific language comprises a textual representation of said second ontology, wherein said main language processor receives said second domain specific language and further enacts said second domain specific language as an executable solutions;
    wherein the at least one extension language processor is a model editor for models based on the second ontology; and
    wherein said first ontology is recursive.

2. A computer-implemented model engineering system comprising: a processor,
    an input device,
    an output device; and
    a computer platform for receiving said model and communicating an output data to said output device, wherein said computer platform comprises:
    stored information, wherein said stored information comprises one or more ontologies,
    wherein each of the one or more ontologies comprises a specialized language, said specialized language comprising a selected description of a selected term, wherein said selected description is selected from a group comprising physical properties and non-physical properties;
    at least a first model based on said first ontology, wherein the first model is transformed via a model-to-text transformation into at least a first domain specific language, wherein said first domain specific language comprises a textual representation of said first ontology;
    a main language processor, wherein said main language processor receives said first domain specific language and enacts said first domain specific language as an executable solution, wherein said main language processor further enacts at least one extension language processor;
    further comprising a second ontology, wherein the second model is further transformed via a model-to-text transformation into a second domain specific language, wherein said second domain specific language comprises a textual representation of said second ontology, wherein said main language processor receives said second domain specific language and further enacts said second domain specific language as an executable solution;
    wherein the at least one extension language processor is a model editor for models based on the second ontology;
    wherein said first ontology is recursive.

3. The computer-implemented model engineering system of claim 2, wherein said second ontology is recursive.

4. A computer-implemented model engineering method comprising a processor executing the steps of:
    receiving stored information, wherein said stored information comprises one or more ontologies, wherein each of the one or more ontologies comprises a specialized language, said specialized language comprising a selected description of a selected term, wherein said selected description is selected from a group comprising physical properties and non-physical properties;
    receiving a first ontology selected from the one or more ontologies,
    receiving at least a first model based on said first ontology,
    transforming via a model-to-text transformation into at least a first domain specific language, wherein said first domain specific language comprises a textual representation of said first ontology;
    receiving a main language processor, wherein said main language processor further receives said first domain specific language, and enacting said first domain specific language as an executable solution, wherein said main language processor further enacts at least one extension language processor;

receiving a second ontology selected from the one or more ontologies;

receiving at least a second model based on said second ontology, wherein the second model is transformed via a model-to-text transformation into a second domain specific language, wherein said second domain specific language comprises a textual representation of said second ontology;

enacting said second domain specific language as an executable solution;

wherein the at least one extension language processor is a model editor for models based on the second ontology; and wherein said first ontology is recursive.

5. The computer-implemented model engineering method of claim 4, further comprising transforming the first model based on said first ontology into the second model based on said second ontology.

6. The computer-implemented model engineering method of claim 4, wherein the at least one extension language processor is a model editor for models based on the first ontology.

7. The computer-implemented model engineering system of claim 4, wherein said second ontology is recursive.

* * * * *